United States Patent
Zhang et al.

(10) Patent No.: US 10,891,943 B2
(45) Date of Patent: Jan. 12, 2021

(54) INTELLIGENT SHORT TEXT INFORMATION RETRIEVE BASED ON DEEP LEARNING

(71) Applicant: Citrix Systems, Inc., Fort Lauderdale, FL (US)

(72) Inventors: Jinren Zhang, Nanjing (CN); Ke Xu, Nanjing (CN); Zhen Fan, Nanjing (CN); Bo Chen, Nanjing (CN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/874,119

(22) Filed: Jan. 18, 2018

(65) Prior Publication Data
US 2019/0221204 A1 Jul. 18, 2019

(51) Int. Cl.
| | |
|---|---|
| *G10L 15/16* | (2006.01) |
| *G06F 17/16* | (2006.01) |
| *G06N 3/04* | (2006.01) |
| *G06F 16/93* | (2019.01) |
| *G06F 16/483* | (2019.01) |
| *G06F 40/30* | (2020.01) |

(52) U.S. Cl.
CPC .......... *G10L 15/16* (2013.01); *G06F 16/483* (2019.01); *G06F 16/93* (2019.01); *G06F 17/16* (2013.01); *G06F 40/30* (2020.01); *G06N 3/0454* (2013.01)

(58) Field of Classification Search
CPC ......... G10L 15/16; G06F 16/93; G06F 16/48; G06F 17/16; G06F 17/2785; G06F 16/483; G06F 17/30011; G06F 40/30; G06K 9/00469; G06K 9/00483; Y10S 707/99933; Y10S 707/99934; G06N 3/0454; G06N 3/08
See application file for complete search history.

(56) References Cited

U.S. PATENT DOCUMENTS

| | | | |
|---|---|---|---|
| 9,852,337 B1 * | 12/2017 | van Rotterdam | G06K 9/00483 |
| 2004/0068396 A1 * | 4/2004 | Kawatani | G06F 16/3347 703/2 |
| 2004/0078363 A1 * | 4/2004 | Kawatani | G06F 17/30011 |
| 2016/0148105 A1 * | 5/2016 | Henmi | G06F 17/2785 706/11 |
| 2016/0196258 A1 * | 7/2016 | Ma | G06F 17/2785 704/8 |
| 2016/0247061 A1 * | 8/2016 | Trask | G06N 3/04 |
| 2017/0161618 A1 * | 6/2017 | Swaminathan | G06F 17/30345 |
| 2018/0068371 A1 * | 3/2018 | Krishnamurthy | G06F 17/276 |
| 2018/0095989 A1 * | 4/2018 | Teofili | G06F 17/30174 |
| 2018/0150743 A1 * | 5/2018 | Ma | G06N 3/04 |
| 2019/0065576 A1 * | 2/2019 | Peng | G06F 16/22 |

* cited by examiner

*Primary Examiner* — Angela A Armstrong
(74) *Attorney, Agent, or Firm* — Foley & Lardner LLP

(57) ABSTRACT

Text based searching can return results based on the system determining the searched text includes keywords or search terms. The present solution can return results based on a semantic analysis. The solutions described herein can provide high accuracy compared against the full-text or keyword-based retrieval algorithms. The solution can sort the results by semantic relevance based on the user's input search request. The present solution can provide meaningful results to the user even when the search text does not include the exact search keywords or phrases entered by the user.

20 Claims, 6 Drawing Sheets

INTELLIGENT SHORT TEXT INFORMATION RETRIEVE BASED ON DEEP LEARNING

BACKGROUND OF THE DISCLOSURE

Text can be searched using keyword matching. The document that is returned can be the document that included the greatest number of keyword matches. For example, the returned document included more instances of the keywords as compared to the documents that were not returned. However, this form of searching requires that the user provide the proper keyword when performing the search. For example, the system may not take into account synonyms or semantically related words when selecting the documents to return in response to a search request.

BRIEF SUMMARY OF THE DISCLOSURE

Text based searching can return results based on the system determining that the searched text includes keywords or search terms. The present solution can return results based on a semantic analysis. The solutions described herein can provide high accuracy compared against the full-text or keyword-based retrieval algorithms. The solution can sort the results by semantic relevance based on the user's input search request. The distance of the user's search request and the searched text can be represented by a Pearson Correlation Coefficient, rather than a number of matching words used by keyword-based algorithms. The present solution can provide meaningful results to the user even when the search text does not include the exact search keywords or phrases entered by the user.

The present solution can retrieve text-based data (e.g., electronic documents, text files, website text, email messages, etc.), images, videos, audio files, or other types of content from large data sets based on deep learning. The solution can convert the text of the input search request and the text of the searched documents into a high dimension data space. The solution can retrieve meaningful results by selecting documents located near the text of the input search result in the high dimension data space.

According to an aspect of the disclosure, a method to retrieve content based on an input can include receiving, by a data processing system, a request that can include a plurality of terms. The method can include generating, by a vector generator executed by the data processing system, a sentence vector to map the request to a first vector space. The method can include retrieving, from a database by the vector generator, a plurality of trained sentence vectors. The trained sentence vectors can correspond to a plurality of candidate electronic documents. Each of the plurality of trained sentence vectors can map a respective sentence to the first vector space. The method can include generating, by a scoring engine executed by the data processing system, a similarity score for each of the plurality of trained sentence vectors. The similarity score can be based on the respective one of the plurality of trained sentence vectors and the sentence vector. The method can include selecting, by the scoring engine, an electronic document from the plurality of candidate electronic documents based on a ranking of the similarity score of each of the plurality of trained sentence vectors. The method can include providing, by the data processing system, the electronic document.

The method can include generating, by the vector generator, a word vector for each of the plurality of terms. The word vector can map a respective term of the plurality of terms to the vector space. The word vector for each of the plurality of terms can include a vector of weights indicating a probability of one of the plurality of terms occurring.

The method can include generating, by the vector generator, the word vector for each of the plurality of terms with one of a Continuous Bag-of-Words neural network model or a Skip-Gram neural network model. The method can include generating, by the vector generator, a trained sentence vector based on an average of candidate word vectors of terms in a sentence.

The method can include generating, by the scoring engine, the similarity score for each of the plurality of trained sentence vectors using a Pearson Similarity Calculation.

In some implementations, the method can include generating, by the scoring engine, a return list. The return list can include a subset of the plurality of candidate electronic documents corresponding to one of the plurality of trained sentence vectors having the similarity score above a predetermined threshold. The method can include providing, by the data processing system, the return list.

The method can include calculating, by the vector generator, the sentence vector based on a difference between an inner product of each of a plurality of word vectors in a sentence and a common sentence vector. The method can include calculating, by the vector generator, a common sentence vector by averaging each of the plurality of trained sentence vectors.

In some implementations, the plurality of candidate electronic documents can include web pages, text files, log files, forum questions, or forum answers. In some implementations, the method can include one-hot encoding, by the vector generator, each of the plurality of terms to generate a binary array for each of the plurality of terms.

According to at least one aspect of the disclosure, a system to retrieve content includes a memory storing processor executable instructions and one or more processors. The system can receive a request that can include a plurality of terms. The system can generate, by a vector generator executed by the one or more processors, a sentence vector to map the request to a first vector space. The system can retrieve, from a database by the vector generator, a plurality of trained sentence vectors corresponding to a plurality of candidate electronic documents. Each of the plurality of trained sentence vectors can map a respective sentence to the vector space. The system can generate, by a scoring engine executed by the one or more processors, a similarity score for each of the plurality of trained sentence vectors. The similarity score can be based on the respective one of the plurality of trained sentence vectors and the sentence vector. The system can select, by the scoring engine, an electronic document from the plurality of candidate electronic documents based on a ranking of the similarity score of each of the plurality of trained sentence vectors. The system can provide the electronic document.

In some implementations, the one or more processors can generate, by the vector generator, a word vector for each of the plurality of terms. The word vector can map a respective term of the plurality of terms to the vector space. The word vector for each of the plurality of terms can include a vector of weights indicating a probability of one of the plurality of terms occurring.

The system can generate, by the vector generator, the word vector for each of the plurality of terms with one of a Continuous Bag-of-Words neural network model or a Skip-Gram neural network model. The system can generate, by the vector generator, a trained sentence vector based on an average of candidate word vectors of terms in a sentence.

In some implementations, the system can generate, by the scoring engine, the similarity score for each of the plurality of trained sentence vectors using a Pearson Similarity Calculation.

In some implementations, the system can generate, by the scoring engine, a return list that can include a subset of the plurality of candidate electronic documents corresponding to one of the plurality of trained sentence vectors having the similarity score above a predetermined threshold. The system can include provide the return list.

In some implementations, the system can calculate, by the vector generator, a common sentence vector by averaging each of the plurality of trained sentence vectors. The plurality of candidate electronic documents can include web pages, text files, log files, forum questions, or forum answers.

BRIEF DESCRIPTION OF THE FIGURES

The foregoing and other objects, aspects, features, and advantages of the present solution will become more apparent and better understood by referring to the following description taken in conjunction with the accompanying drawings, in which.

Figure 1A:
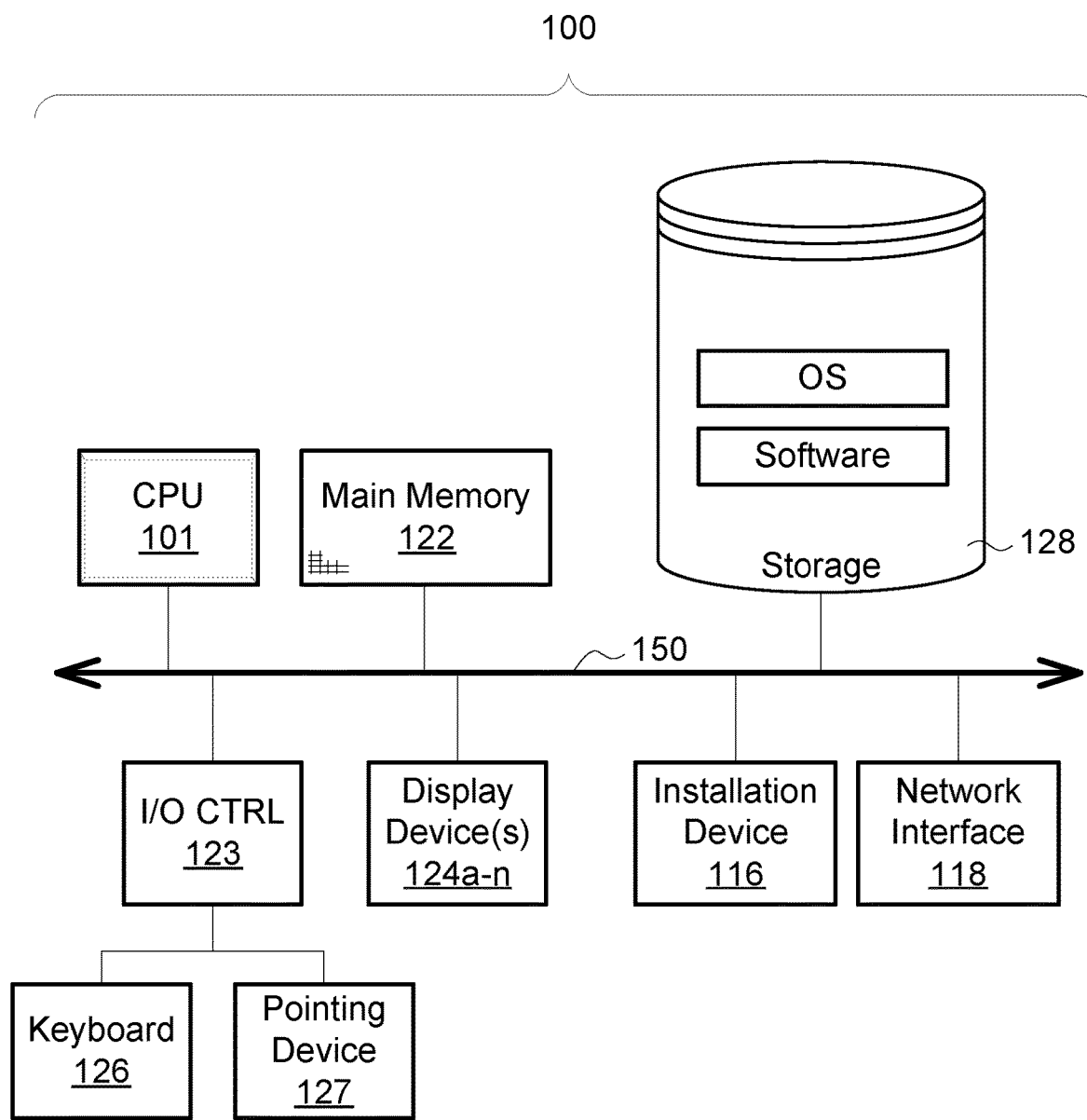
FIGS. 1A-1D illustrate block diagrams of embodiments of a computing device.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a computing environment which may be useful for practicing embodiments described herein; and Section B describes systems and methods for information retrieval based on deep learning.

A. Computing Environment

Figure 1B:
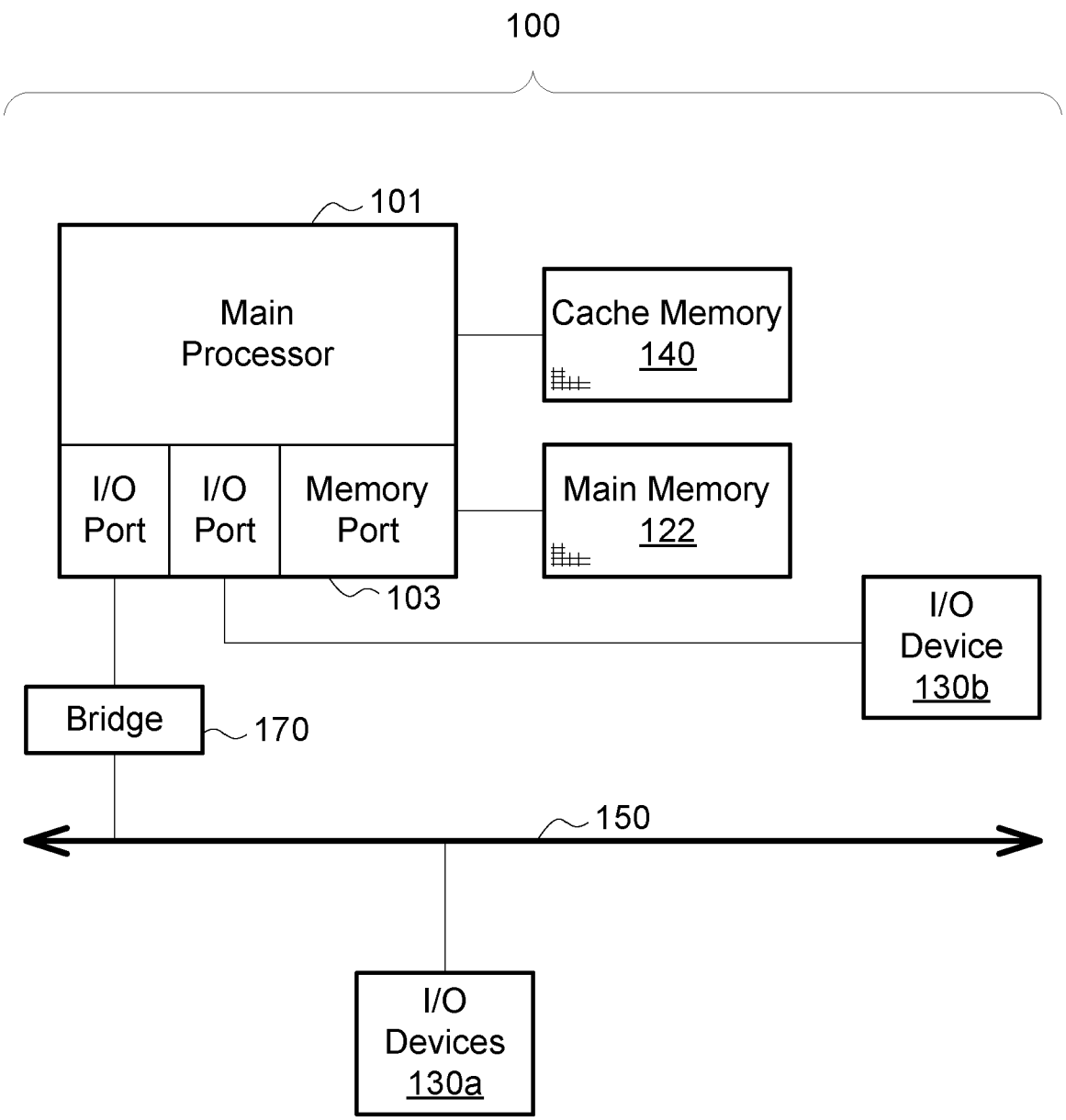

Prior to discussing the specifics of embodiments of the systems and methods of an appliance and/or client, it may be helpful to discuss the computing environments in which such embodiments may be deployed. FIGS. 1A and 1B depict block diagrams of a computing device 100 useful for practicing embodiments of the systems and devices described further below in Section B. As shown in FIGS. 1A and 1B, each computing device 100 includes a central processing unit 101, and a main memory unit 122. As shown in FIG. 1A, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101. In some embodiments, the input/output devices 130a-130b can include audio output devices, such as a speaker, headphones, or an audio output port configured to communicatively couple with an external audio output device.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Samsung Electronics of Suwon, Korea; those manufactured by Micron Technology of Boise, Id.; those manufactured by Transmeta Corporation of Santa Clara, Calif.; those manufactured by International Business Machines of White Plains, N.Y.; or those manufactured by Advanced Micro Devices of Sunnyvale, Calif., among others. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1A, the processor 101 communicates with main memory 122 via a system bus 150 (described in more detail below). FIG. 1B depicts an embodiment of a computing device 100 in which the processor communicates directly with main memory 122 via a memory port 103. For example, in FIG. 1B the main memory 122 may be DRDRAM.

FIG. 1B depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1B, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1B depicts an embodiment of a computer 100 in which the main processor 101 communicates directly with I/O device 130b via HyperTransport, Rapid I/O, or InfiniBand. FIG. 1B also depicts an embodiment in which local busses and direct communication are mixed: the processor 101 communicates with I/O device 130b using a local interconnect bus while communicating with I/O device 130a directly.

The computing device 100 may support any suitable installation device 116, such as a CD-ROM drive, a CD-R/RW drive, a DVD-ROM drive, tape drives of various formats, USB device, hard-drive or any other device suitable for installing software and programs. The computing device 100 may further comprise a storage device 128, such as one or more hard disk drives or redundant arrays of independent disks, for storing an operating system and other related software, and for storing application software programs. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1A. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, Calif. or SanDisk Corporation of Milpitas, Calif.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1A and 1B typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, WINDOWS XP, WINDOWS 7, and WINDOWS 10, all of which are manufactured by Microsoft Corporation of Redmond, Wash.; MacOS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a UNIX operating system, among others.

In other embodiments, the computing device 100 may have different processors, operating systems, and input devices consistent with the device. For example, in one embodiment the computer 100 may be a smartphone or a tablet, such as those developed by Apple Inc., by Samsung Electronics, by Xiaomi. Inc., or by Google Inc., among others. In this embodiment, the smartphone or tablet may be operated under the control of an operating system (such as Android or iOS) and may include a stylus input device as well as a touch sensitive screen. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1C:
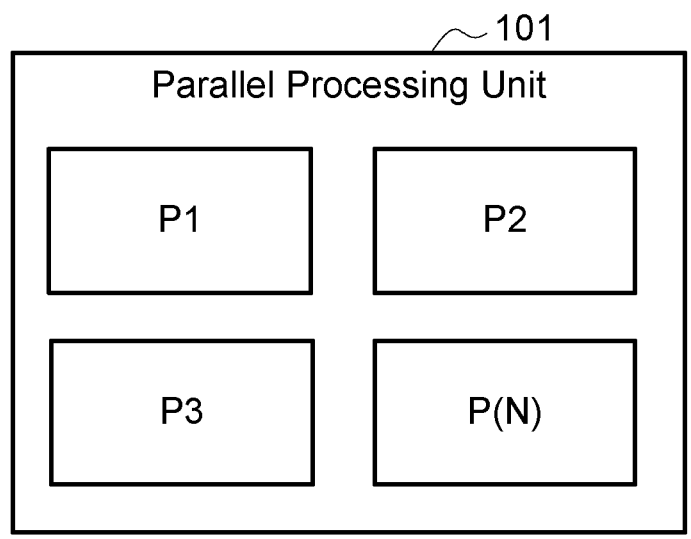

As shown in FIG. 1C, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a Cell Broadband Engine architecture and including a Power processor element and a plurality of synergistic processing elements, the Power processor element and the plurality of synergistic processing elements linked together by an internal high-speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1D:
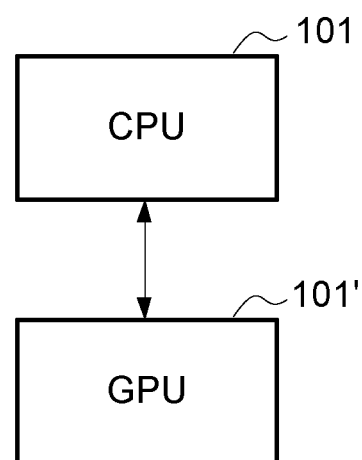

In some embodiments, the computing device 100 may comprise a graphics processing unit. In one of these embodiments depicted in FIG. 1D, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Information Retrieval Based on Deep Learning

Text based searching can return results based on the system determining that the searched text includes keywords or search terms. The present solution can return results based on a semantic analysis. The solutions described herein can provide high accuracy compared against the full-text or keyword-based retrieval algorithms. The solution can sort the results by semantic relevance based on the user's input search request. The distance between the user's search request and the searched text can be represented by a Pearson Correlation Coefficient, rather than a number of matching words used by keyword-based algorithms. The present solution can provide meaningful results to the user even when the search text does not include the exact search keywords or phrases entered by the user.

The present solution can retrieve text-based data (e.g., electronic documents, text files, website text, email messages, etc.), images, videos, audio files, or other types of content from large data sets based on deep learning. The solution can convert the text of the input search request and the text of the searched documents into a high dimension data space. The solution can retrieve meaningful results by selecting documents located near the text of the input search result in the high dimension data space.

Figure 2:
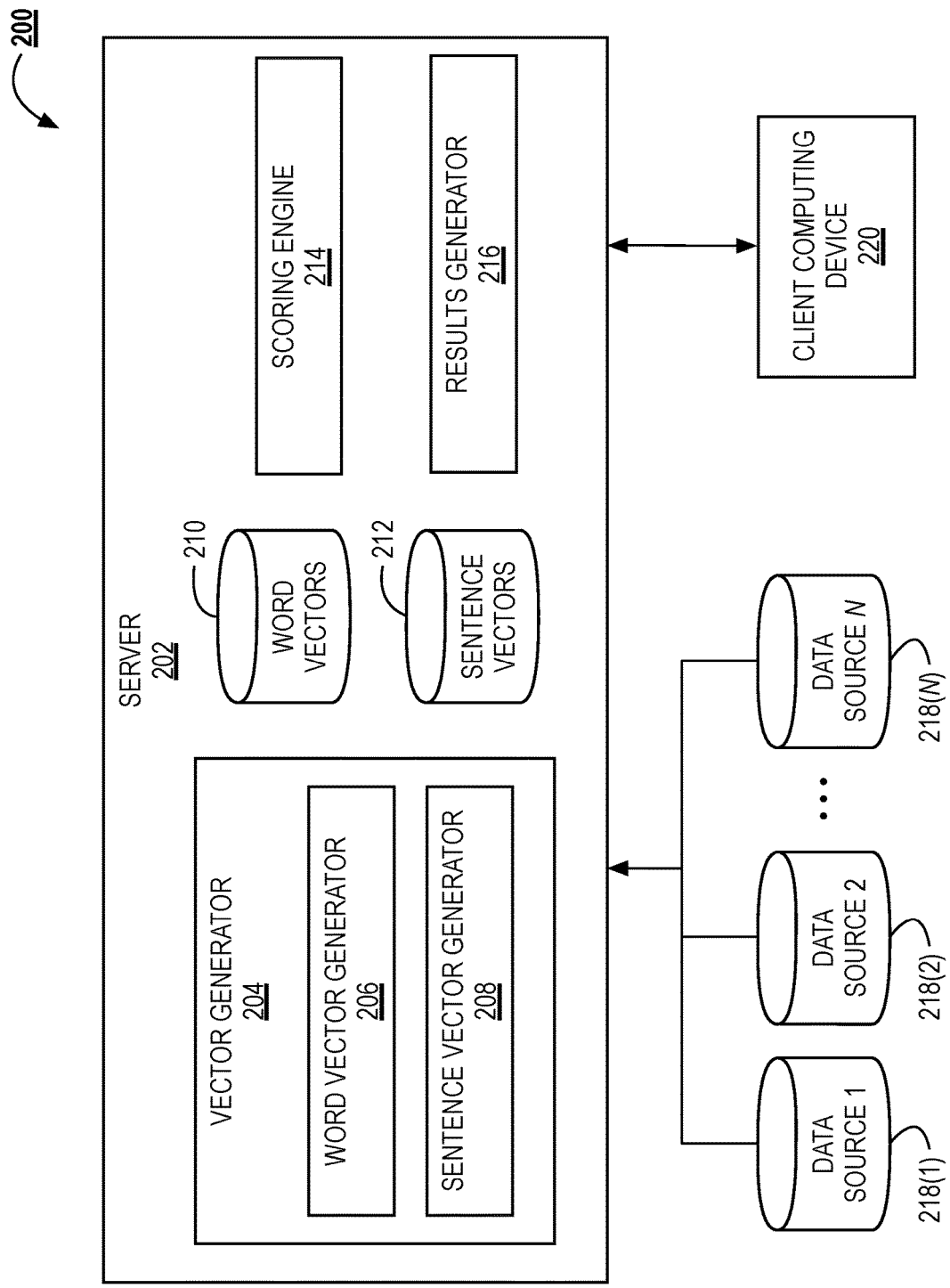
FIG. 2 illustrates a block diagram of an example system to retrieve content based on an input.

FIG. 2 illustrates a block diagram of an example system 200 to retrieve content based on an input. In brief summary, the system 200 includes a server 202, data sources 218(1)-218(N) (collectively referred to as data sources 218), and a client device 220. The server 202 executes a vector generator 204 that includes a word vector generator 206 and a sentence vector generator 208. The server 202 also executes a scoring engine 214 and a results generator 216. The server 202 includes memory on which the server 202 stores a word vector database 210 and a sentence vector database 212. The server 202 and the client device 220 can be a computing device 100, as described above, and can be referred to as a data processing system.

As illustrated in FIG. 2, the server 202, the data sources 218, and the client device 220 are all capable of communicating with one another. In various embodiments, each of the above-mentioned elements or entities of the system 200 can be implemented in hardware, software, or a combination of hardware and software. In some embodiments, each component of the system 200 may be implemented using the hardware or a combination of the hardware or software detailed above in connection with FIGS. 1A-1D. For example, in some embodiments, the vector generator 204, the word vector generator 206, the sentence vector generator 208, the scoring engine 214, and the results generator 216 can include any application, program, library, script, task, service, process, or any type and form of executable instructions executing on hardware of the server 202.

The hardware can include circuitry such as one or more processors in one or more embodiments. Communication between the server 202, the client device 220, and the data sources 218 can take place over any type or form of network. For example, such communications can be carried out via any type of network capable of supporting communications between the server 202, the data sources 218, and the client device 220. In some embodiments, the communications can be performed via any of a local-area network (LAN) (e.g., a company Intranet), a metropolitan area network (MAN), or a wide area network (WAN) (e.g., the Internet).

In some implementations, certain functionality described below in connection with the server 202 and the client device 220 could be combined such that the functionality of the two or more of components depicted in FIG. 2 may be implemented by a single device. For example, the client device 220 could execute an instance of the vector generator 204, the word vector generator 206, the sentence vector generator 208, the scoring engine 214, and the results generator 216 and store (or have access to) the word vector database 210 and the sentence vector database 212. For example, the client device 220 can execute an instance of the vector generator 204, the word vector generator 206, the sentence vector generator 208, the scoring engine 214, and the results generator 216 to search text-based data stored locally at the client device 220.

The server 202 can be configured to receive a request from the client device 220. The client device 220 can transmit the request to the server 202 over a network, for example. The request can include a plurality of terms. The plurality of terms can form, and be referred to as, a search string. The server 202 can receive the request through a web-based interface. For example, the client device 220 can access website hosted by the server 202 or corresponding to the server 202 that includes an input field. Text entered into the input field can be transmitted over the HTTP protocol to the server 202.

The request can be a text-based search request. In some implementations, the request can be in other formats. For example, the request can be an audio-based request that the server 202 or the client device 220 can convert into a string of text using natural language processing. The server 202 can use the request to perform, as described below, a semantic analysis of candidate electronic documents stored in the data sources 218 and return one or more electronic documents based on the semantic analysis. The server 202 can provide the client device 220 with a return list of selected electronic documents or a single electronic document selected from among the candidate electronic documents stored on the data sources 218.

The data sources 218 can include databases stored locally on the server 202 or remote from the server 202. The data sources 218 can each include a plurality of candidate electronic documents. The candidate electronic documents can include the text that the user wishes to search when submitting a request to the server 202. The candidate electronic documents can include text-based documents, web pages, emails, and other electronic messages, forum posts, help files, log files, or any combination thereof. In some implementations, each of the data sources 218 can store a different form of electronic document. For example, the data source 218(1) may store text-based documents and the data source 218(2) can store emails.

The server 202 can execute the vector generator 204. As an overview, the vector generator 204 can convert terms or words included in the request or data sources 218 into a high dimensional data space. The conversion of the text into the high dimensional space can enable the server 202 to return highly accurate and intelligent responses by determining results based at a semantic level rather than based on keyword matching. For example, the server 202 can base the selection of results based on the distance between the input request and the different electronic documents in the high dimensional data space rather than on the number of times the electronic documents match one or more terms in the request.

The vector generator 204 can perform data pre-processing. Data pre-processing can include training the neural network of the word vector generator 206, extracting text from the data sources 218 and input request, and preparing text from the data sources 218 and the input requests.

The vector generator 204 can process the electronic documents stored in the data sources 218 to retrieve the text from the electronic documents. For example, the vector generator 204 can extract the text from the electronic documents and parse the text into strings that are stored in association with an identifier of the electronic document from which the text was extracted. In one example, the electronic document can be a web page and the vector generator 204 can process the content of the web page and identify text between predetermined HTML tags (e.g., <p> and </p>) to separate the text from formatting and other code included in the web page.

For each of the electronic documents, the vector generator 204 can convert the extracted text into an array of words. For example, for a given electronic document, the vector generator 204 can convert the string of text into the array: [term_1, term_2, . . . , term_n], where term_n is the last term in the electronic document. The array can include punctuation. The vector generator 204 can convert the extracted text into a data structure that, for each electronic document, includes a plurality of arrays. Each of the arrays in the data structure can correspond to a sentence in the extracted text. For example, the vector generator 204 can process an array that includes all the text and punctuation from the electronic document. The vector generator 204 can parse the array and generate different arrays for each of the sentences when the vector generator 204 identifies a period in the array.

Pre-processing can also include generating a dictionary of the words included in the electronic documents. The vector generator 204 can generate the dictionary by processing the words included in the data sources 218 and assigning a unique integer value to each word that appears in the data sources 218. As the server 202 receives text (e.g., from a search request), the server 202 can use the dictionary as a look up table to convert words (a key in the lookup table) into the assigned integer value (a value in the lookup table).

The vector generator 204 can one-hot encode each entry in the dictionary as a binary array of length l, where l is the number of entries in the dictionary. For example, if "network" is assigned the integer value of 4,392 in the dictionary and the dictionary contains 10,000 entries, the one-hot encoded array for "network" could be an array with a length of 10,000 containing all zeros except for a 1 in position corresponding to 4,392. In some implementations, the vector generator 204 can limit the dictionary to the most commonly occurring 5,000, 10,000, 20,000, 30,000, 40,000, or 50,000 terms. In some implementations, the dictionary can include all the terms included in the data sources 218.

The pre-processing performed by the vector generator 204 can also include training the neural networks of the word vector generator 206 and sentence vector generator 208. When training the neural networks, the vector generator 204 can generate training pairs from the extracted text. The training pairs can be used to train the neural network of the word vector generator 206 or sentence vector generator 208. For example, one term in the pair can be used as an input to the neural network and one term can be used as the expected output of the neural network given the input term.

For a given array of terms t, the training pairs for the term at position n (e.g., the input word) can include the pairs: (t[n], t[n+1]), . . . , (t[n], t[n+w]), where w is the window size. For example, for a window size of 2, the training pairs for the term at position n in the array would include four training pairs: the term at position n paired with the term at n−2, n−1, n+1, and n+2. In this example, given a term, the training pairs provide the four terms surrounding the input term (e.g., the two terms on either side of the input term). In this example, when training a neural network, the term at position n is used as an input and the terms at n−2, n−1, n+1, and n+2 are used as outputs. The vector generator 204 can process through all the terms in the data sources 218 and generate training pairs for each of the terms in the data sources 218.

The server 202 can execute the word vector generator 206, which can be a component of the vector generator 204. The word vector generator 206 can generate a word vector for each word in the data sources 218 and for the words in the input request the server 202 receives from the client device 220.

The word vector, for a given word, can include a vector of weights indicating a probability that the given word will occur in a body of text. The word vector can represent a given word in a continuous vector space where semantically similar words are mapped to nearby points.

The word vector generator 206 can generate the word vector, for a give term, using neural networks or principal component analysis. For example, the word vector generator 206 can generate the word vector using a neural network that includes an input layer, a hidden layer, and an output layer. The input layer and the output layer can include l neurons, where l is the number of unique terms in the dictionary generated by the vector generator 204. The hidden layer can have between about 150 neurons and about 225 neurons, between about 150 neurons and about 325 neurons, between about 150 neurons and about 425 neurons, between about 150 neurons and about 500 neurons. For example, in some implementations, the hidden layer can include about 300 neurons.

The word vector generator 206 can train the neural network using the training pairs generated by the vector generator 204. For example, for each training pair, the input term is one-hot encoded and used as an input to the neural network and the output terms are one-hot encoded and used as outputs of the neural network for the given input term.

Once trained, the word vector generator 206 can use the weights of the hidden layer to generate the word vector for a given term. For example, training the neural network generates a matrix of weights with the size X×l, wherein X is the number of neurons in the hidden layer and l is the number of terms in the dictionary (and the length of the one-hot encoded vectors). The word vector generator 206 can store the matrix in the word vector database 210. The word vector generator 206 can use the matrix as a lookup table for the word vectors. For example, for a given term, the one-hot encoded vector of the term can be multiplied by the matrix to generate a word vector for the given term. Multiplying the matrix by the one-hot encoded vector of the term selects a row from the matrix, which server 202 can use as the word vector for the term. In some implementations, the word vectors can be stored as a lookup table for each input term rather than a matrix.

The word vector generator 206 can generate the word vector for each of the plurality of words with one of a continuous Bag-of-Words neural network model or a Skip-Gram neural network model. In some implementations, the word vector generator 206 can used Word2Vec to generate the word vectors. During a search phase, the word vector generator 206 can generate a word vector for each of the words in the request the server 202 receives from the client device 220.

The word vector generator 206 can generate word vectors for each of the words of the data sources 218 during a training phase. The word vector generator 206 can periodically reprocess the data sources 218 to generate updated word vectors for the words of the data sources 218 to account for terms that were removed or added to the data sources 218 through the addition or removal of electronic documents to the data sources 218.

The server 202 can execute the sentence vector generator 208, which can be a component of the vector generator 204. The sentence vector generator 208 can be configured to generate a sentence vector to map sentences and the input request to the vector space.

For each sentence in the data sources 218, the sentence vector generator 208 can generate a trained sentence vector for each sentence based on an average of the word vectors of the words in the sentence. For example, if a given sentence includes five words, the sentence vector generator 208 can select the word vector that corresponds to each of the five words from the word vector database 210 and average the word vectors to form a trained sentence vector for the sentence. The sentence vector generator 208 can store the trained sentence vector in the sentence vector database 212 in association with an identifier indicating from which electronic document the sentence was extracted. The sentence vector generator 208 can generate a trained sentence vector for each of the sentences identified in the data sources 218.

The sentence vector can be based on the weight and frequency of each word vector for the words in the sentence. In some implementations, the sentence vector generator 208 can be configured to calculate the sentence vector based on a difference between an inner product of each of a plurality of word vectors in a sentence and a common sentence vector. This process can provide, when averaging the word vectors of the words in a sentence to generate the sentence vector, lower weights to the frequently occurring words and higher weights to the less frequently occurring words.

During the searching phase, the sentence vector generator 208 can generate a sentence vector for the input request. The sentence vector generator 208 can combine the word vectors of the words in the input request in the same manner as the word vectors were combined to form the trained sentence vectors.

The scoring engine 214 can generate a similarity for each of the trained sentence vectors. The similarity score for a trained sentence vector can be based on the trained sentence vectors and the sentence vector for the input request. For example, the scoring engine 214 can calculate the similarity score by determining the distance between the trained sentence vector and the sentence vector of the input request. The scoring engine 214 can determine the distance between a trained sentence vector and the sentence vector of the input request using a Pearson similarity calculation to determine a Pearson Correlation Coefficient. In some implementations, the scoring engine 214 can calculate a similarity score for each of the sentences in the data sources 218 that indicates how close the sentence is to the text of the input request in the vector space.

The results generator 216 can select or compile results (e.g., electronic documents) based on the calculated similarity scores. For example, the results generator 216 can be configured to select an electronic document from the data sources 218 to return in response to the input request. The electronic documents in the data sources 218 can be referred to as candidate documents. The results generator 216 can select an electronic document or a subset of the candidate documents to return in response to the input request. In some implementations, the results generator 216 can select the candidate electronic document having the highest similarity score as the electronic document to be returned. In some implementations, the results generator 216 can select the top 10, 25, 50, or 100 candidate documents. For example, the results generator 216 can be configured to generate a return list that includes a subset of the plurality of candidate electronic documents. The return list can include a listing of candidate documents that included a trained sentence vector with a similarity score above a predetermined threshold.

Figure 3:
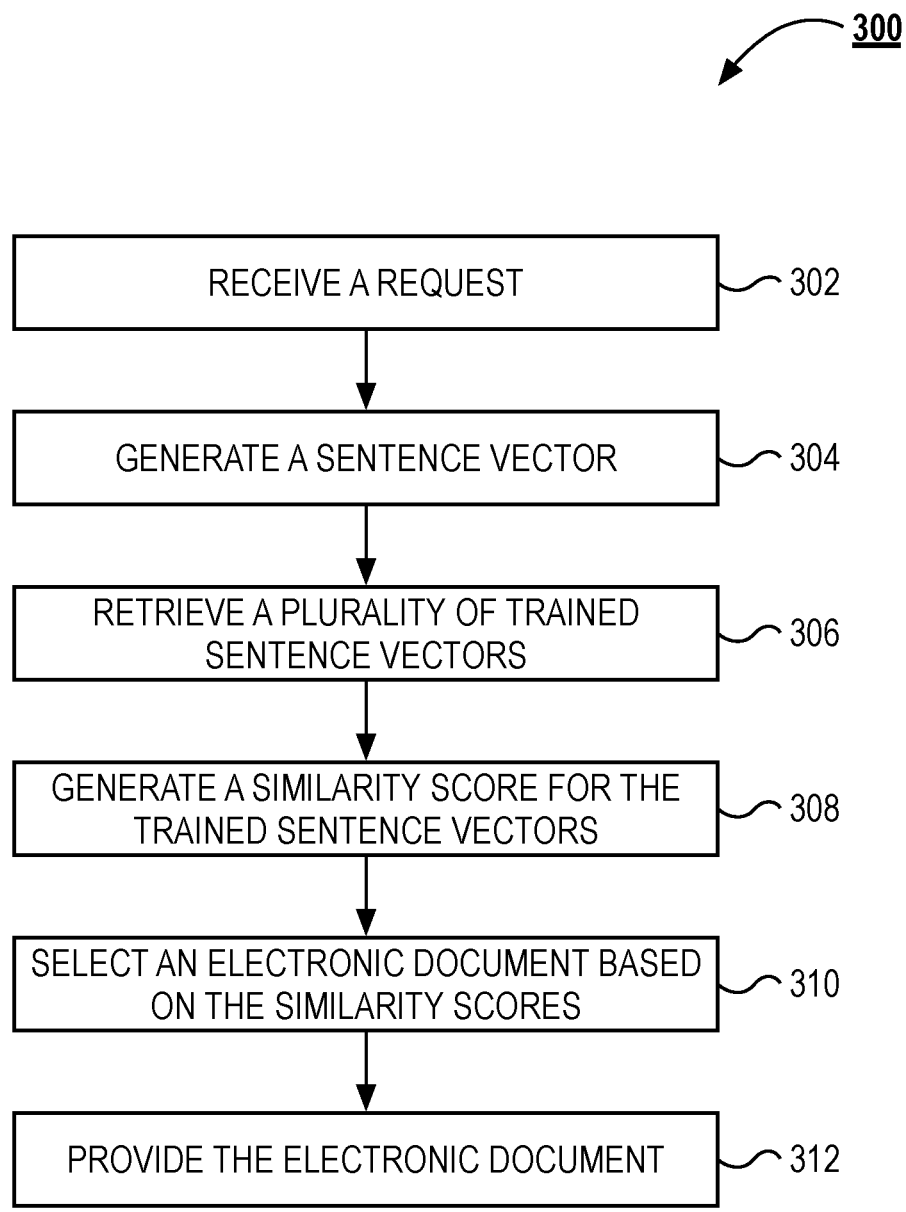
FIG. 3 illustrates a block diagram of an example method to retrieve content based on an input using the system illustrated in FIG. 2.

FIG. 3 illustrates a block diagram of an example method 300 to retrieve content based on an input. The method 300 can be, for example, performed with the systems illustrated in FIGS. 1A-2A. The method 300 can include receiving a request (BLOCK 302). The method 300 can include generating a sentence vector (BLOCK 304). The method 300 can include retrieving trained sentence vectors (BLOCK 306). The method 300 can include generating similarity scores for the trained sentence vectors (BLOCK 308). The method 300 can include selecting an electronic document (BLOCK 310). The method 300 can include providing the electronic document (BLOCK 312).

As set forth above, the method 300 can include receiving a request (BLOCK 302). Also referring to FIG. 2, among others, the request can include a plurality of terms. The plurality of terms can be included in an input string that is received by the server 202. The plurality of terms can be a search request that is received from the client device 220. For example, the client device 220 can access a web page provided by the server 202. The web page can be a search page to search electronic documents made available by the server 202 (or other computing devices). For example, the web page can be a search page to search web pages, text files, log files, forum questions, or forum answers provided by the server 202 or other computing devices. In one example, the web page can be a search page to search help files provided by the server 202. The request can include a plurality of terms that form a question to which the user would like to find an answer by searching, for example, the help files. The plurality of terms can be in a sentence form (e.g., "What is the bandwidth of Model XYZ?") or a string of terms (e.g., "bandwidth Model XYZ").

The server 202 can receive the request as an input string. The server 202 can pre-process the input string to parse the string into different words. For example, the server 202 can parse the input string to identify spaces or punctuation. The server 202 can divide the input string into different words by dividing the input string at the identified spaces or punctuation.

In some implementations, the request can be a request for other types of content, such as audio-based content, image-based content, or video-based content. The request can be a text-based input, an audio-based input, an image-based input, or a video-based input.

The method 300 can include generating a sentence vector (BLOCK 304). The vector generator 204 can generate a sentence vector for the request. The sentence vector can map the request (or string of terms included therein) to a vector space. As described above, during a training phase, the vector generator 204 can generate a plurality of word vectors. The vector generator 204 can generate a word vector for each of the terms in a dictionary. In some implementations, to generate the sentence vector for the request, the word vector generator 206 can retrieve the word vector corresponding to each of the terms in the input string of the request. The sentence vector generator 208 can convert the plurality of retrieved word vectors into a sentence vector for the input string. For example, the sentence vector generator 208 can average or combine the word vectors to form a sentence vector. In some implementations, the vector generator 204 can treat the input string of the request as a single sentence and generate a single sentence vector for the request. In some implementations, the server 202 can determine if the input string includes multiple sentences and generate a different sentence vector for each of the sentences identified in the input string.

The method 300 can include retrieving trained sentence vectors (BLOCK 306). As described above, during the training phase, the vector generator 204 can generate a word vector for each word included in the electronic documents of the data sources 218. The sentence vector generator 208 can generate sentence vectors for each of the sentences included in the data sources 218 based on the word vectors. The sentence vectors for the sentences in the data sources 218 can be referred to as the trained sentence vectors. The trained sentence vectors can be stored in the sentence vector database 212 in association with an identifier of which electronic document the trained sentence vector corresponds. For example, all the sentences from a first electronic document can be converted into sentence vectors and stored in the sentence vector database 212 in association with a unique identifier that identifies the first electronic document. Each of the trained sentence vectors may map a respective sentence to the vector space.

The method 300 can include generating similarity scores (BLOCK 308). The scoring engine 214 can generate a similarity score for each of the trained sentence vectors. The similarity score for the trained sentence vector can be based on the respective trained sentence vector and the sentence vector of the request (e.g., the sentence vector generated at BLOCK 304). The similarity score can represent a similarity between the respective trained sentence vector and the sentence vector of the request. For example, the similarity score can indicate a distance between the respective trained sentence vector and the sentence vector of the request in the vector space. In some implementations, the scoring engine 214 can calculate the similarity score between the respective trained sentence vector and the sentence vector of the input request using Pearson Correlation.

In some implementations, for each of the candidate documents (e.g., the electronic documents contained in data sources 218 that can be returned responsive to a request), the scoring engine 214 can generate a single similarity score. For example, the scoring engine 214 can combine with an average or a weighted average each of the similarity scores of the candidate document into a single similarity score. In some implementations, the scoring engine 214 can count a number of instances when the similarity scores of sentences of a candidate document cross a predetermined threshold. The number of crossing for the candidate document can indicate the number of sentences within the candidate document that are relevant to the request. In some implementations, the scoring engine 214 can return an array of similarity scores for a candidate document that indicates the similarity score for each sentence in the candidate document. In some implementations, the scoring engine 214 can assign the highest similarity score of the sentences in a candidate document as the similarity score for the candidate document.

The method 300 can include selecting an electronic document (BLOCK 310). The results generator 216 can select the electronic document from among the candidate documents stored in the data sources 218. The results generator 216 can select the electronic document based on the similarity scores of the candidate documents (or the similarity scores associated with each of the sentences contained within the respective candidate documents). The results generator 216 can select the electronic document based on the number of times sentences within the electronic document have similarity scores that cross the predetermined threshold. For example, the results generator 216 can select the electronic document that includes the greatest number of sentences with a similarity score above the predetermined threshold.

In some implementations, the selected electronic document can be the candidate document that is most relevant to the request as indicated by a high similarity score. In some implementations, the results generator 216 can select a plurality of relevant documents. For example, the results generator 216 can select (or generate a result containing) the top 10, 25, 50, 75, or 100 candidate documents. The ranking and selection of the candidate documents can be based on the individual similarity scores for the sentences within each of the candidate documents or for the single similarity score of the candidate document (which can be based on the similarity scores for each of the sentences within the respective candidate document).

The method 300 can include providing the selected document (BLOCK 312). In some implementations, the server 202 can transmit the selected document (or documents) to the client device 220. In some implementations, a results list can be provided to the client device 220. The results list, for example, can include a link to the selected document (or documents) that enables the client device 220 to retrieve (or request) the selected document. For example, the results list can be provided to the client device 220 as a web page of results. The web page can include hyperlinks to each of the selected documents. The results list can include excerpts from the selected documents that are presented with the results list. In some implementations, the excerpts include the sentence corresponding to the highest trained sentence vector for the electronic document. The excerpt can also include one or more sentences before and after the sentence corresponding to the highest trained sentence vector.

In some implementations, once the electronic document provided, the client device 220 can provide an updated or new request to the server 202. The server 202 can use the updated request to search within the returned electronic document or to perform a new search on each of the candidate documents in the data sources 218.

In some implementations, the results generator 216 can provide suggested search terms back to the client device 220. The server 202 can select the suggested search terms by searching the word vectors in the word vector database 210 for one or more word vectors that are located substantially close to one or more of the words in the request in the vector space. For example, the word vector generator 206 can convert each of the words of the request into a word vector. The word vector generator 206 can use Pearson Correlation to identify words in the dictionary with a word vector that is close in the vector space to the word vector of a word identified in the request. For example, for a given input word in the request, the word vector generator 206 can select one or more words from the dictionary with word vectors that have a Pearson Correlation with the word vector of the input word above a predetermined threshold. The selected words can be semantically related to the input word without having a keyword match to the input word.

Figure 4:
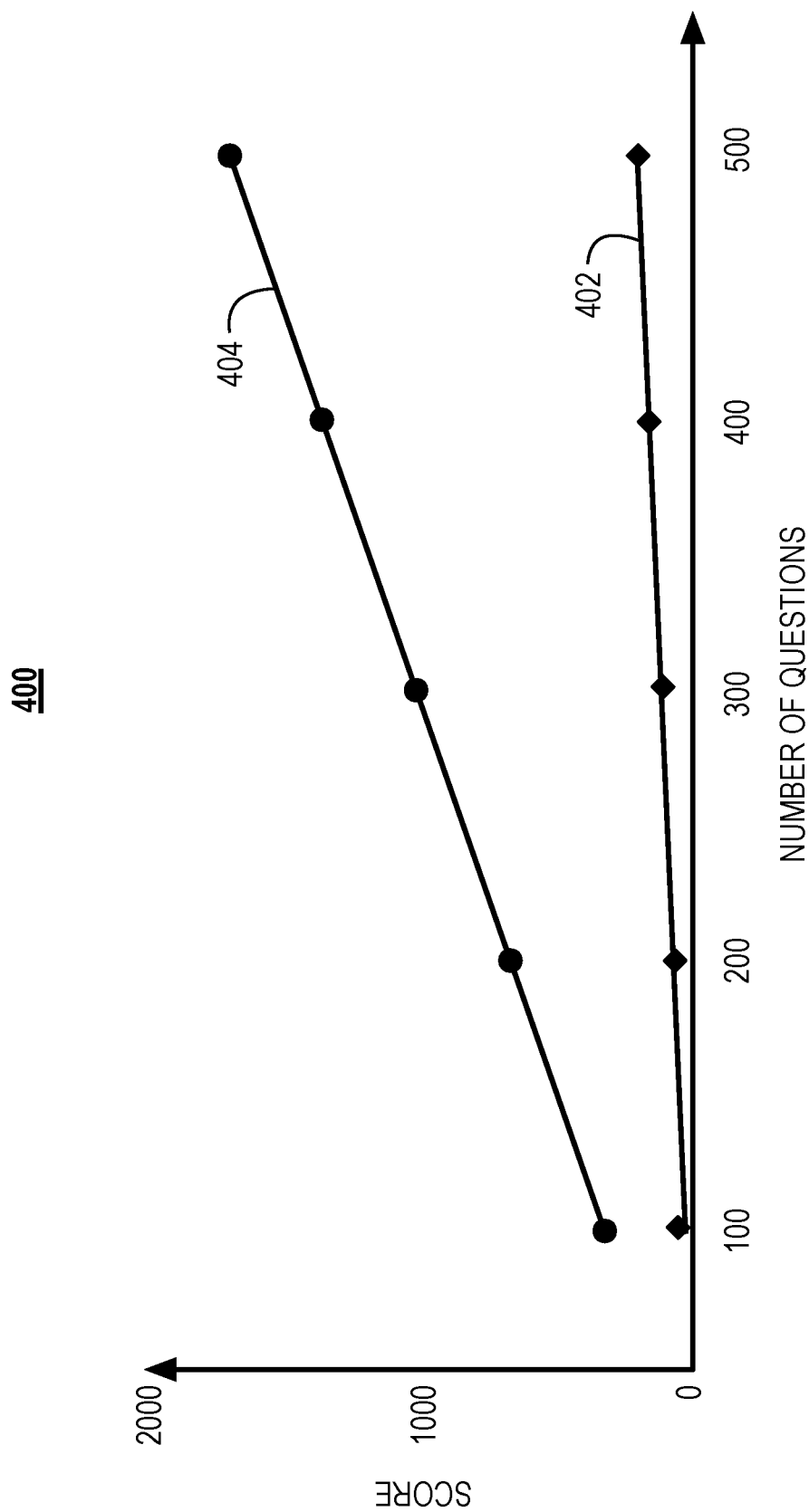
FIG. 4 illustrates a plot comparing the quality of search results using the systems and method described herein to a keyword-based search.

FIG. 4 illustrates a plot 400 comparing the quality of search results using the systems and method described herein to a keyword-based search. The plot 400 includes a first line 402 that illustrates the scores of the keyword-based search and a second line 404 that illustrates the scores of the systems described herein. The plot 400 illustrates the score for the two systems when asked 100, 200, 300, 400, and 500 questions.

To generate the first line 402 and the second line 404, each system was provided a request that included a forum question. A system was given 3 points if the respective system returned the correct response (e.g., the web page containing the answer to the question), 1 point if the correct response was within a list of 5 returned web pages, and 0 points if the correct response was not in the list of 5 returned web pages. As illustrated in the plot 400, the present solution provided the correct response the majority of the time, while the keyword-based system often failed to include the correct response in its list of 5 responses.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, or a computer readable non-volatile storage unit (e.g., CD-ROM, USB Flash memory, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C #, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method to retrieve content based on text input, comprising:
    receiving, by a data processing system, a request comprising a plurality of terms;
    determining, by a vector generator executed by the data processing system, an average of a plurality of word vectors, the plurality of word vectors including a word vector retrieved for each term of the plurality of terms of the request, the plurality of word vectors generated by multiplying an encoded vector for a respective term of the plurality of terms by a matrix of weights provided by at least one intermediate layer of a neural network;
    generating, by the vector generator using the average of the plurality of word vectors, a sentence vector to map the request to a first vector space;
    retrieving, from a database by the vector generator, a plurality of trained sentence vectors corresponding to a plurality of candidate electronic documents, wherein each of the plurality of trained sentence vectors map a respective sentence of each of the plurality of candidate electronic documents to the first vector space;
determining, by a scoring engine executed by the data processing system, a distance in the first vector space between the sentence vector and each trained sentence vector of the plurality of trained sentence vectors;
generating, by the scoring engine, a similarity score for each of the plurality of trained sentence vectors based on the respective one of the plurality of trained sentence vectors and the sentence vector and the distance in the first vector space between the sentence vector and each trained sentence vector of the plurality of trained sentence vectors;
selecting, by the scoring engine, an electronic document from the plurality of candidate electronic documents based on a ranking of the similarity score of each of the plurality of trained sentence vectors; and
providing, by the data processing system, the electronic document.

2. The method of claim 1, further comprising generating, by the vector generator, a word vector for each of the plurality of terms, wherein the word vector maps a respective term of the plurality of terms to a second vector space.

3. The method of claim 2, wherein the word vector for each of the plurality of terms comprise a vector of weights indicating a probability of one of the plurality of terms occurring.

4. The method of claim 2, further comprising generating, by the vector generator, the word vector for each of the plurality of terms with one of a Continuous Bag-of-Words neural network model or a Skip-Gram neural network model.

5. The method of claim 1, further comprising generating, by the vector generator, a trained sentence vector based on an average of candidate word vectors of terms in a sentence.

6. The method of claim 1, further comprising generating, by the scoring engine, the similarity score for each of the plurality of trained sentence vectors using a Pearson Similarity Calculation.

7. The method of claim 1, further comprising:
generating, by the scoring engine, a return list comprising a subset of the plurality of candidate electronic documents corresponding to one of the plurality of trained sentence vectors having the similarity score above a predetermined threshold; and
providing, by the data processing system, the return list.

8. The method of claim 1, further comprising:
calculating, by the vector generator, the sentence vector based on a difference between an inner product of each of a plurality of word vectors in a sentence and a common sentence vector.

9. The method of claim 8, further comprising calculating, by the vector generator, a common sentence vector by averaging each of the plurality of trained sentence vectors.

10. The method of claim 1, wherein the plurality of candidate electronic documents comprise web pages, text files, log files, forum questions, or forum answers.

11. The method of claim 1, further comprising one hot encoding, by the vector generator, each of the plurality of terms to generate a binary array for each of the plurality of terms.

12. A system to retrieve content based on text input, the system comprising a memory storing processor executable instructions and one or more processors to:
receive a request comprising a plurality of terms;
determine, by a vector generator executed by the data processing system, an average of a plurality of word vectors, the plurality of word vectors including a word vector retrieved for each term of the plurality of terms of the request, the plurality of word vectors generated by multiplying an encoded vector for a respective term of the plurality of terms by a matrix of weights provided by at least one intermediate layer of a neural network;
generate, by the vector generator using the average of the plurality of word vectors, a sentence vector to map the request to a first vector space;
retrieve, from a database by the vector generator, a plurality of trained sentence vectors corresponding to a plurality of candidate electronic documents, wherein each of the plurality of trained sentence vectors map a respective sentence of each of the plurality of candidate electronic documents to the first vector space;
determine, by a scoring engine executed by the data processing system, a distance in the first vector space between the sentence vector and each trained sentence vector of the plurality of trained sentence vectors;
generate, by the scoring engine, a similarity score for each of the plurality of trained sentence vectors based on the respective one of the plurality of trained sentence vectors and the sentence vector and the distance in the first vector space between the sentence vector and each trained sentence vector of the plurality of trained sentence vectors;
select, by the scoring engine, an electronic document from the plurality of candidate electronic documents based on a ranking of the similarity score of each of the plurality of trained sentence vectors; and
provide the electronic document.

13. The system of claim 12, further comprising the one or more processors to generate, by the vector generator, a word vector for each of the plurality of terms, wherein the word vector maps a respective term of the plurality of terms to a second vector space.

14. The system of claim 13, wherein word vector for each of the plurality of terms comprises a vector of weights indicating a probability of one of the plurality of terms occurring.

15. The system of claim 13, further comprising the one or more processors to generate, by the vector generator, the word vector for each of the plurality of terms with one of a Continuous Bag-of-Words neural network model or a Skip-Gram neural network model.

16. The system of claim 12, further comprising the one or more processors to generate, by the vector generator, a trained sentence vector based on an average of candidate word vectors of terms in a sentence.

17. The system of claim 12, further comprising the one or more processors to generate, by the scoring engine, the similarity score for each of the plurality of trained sentence vectors using a Pearson Similarity Calculation.

18. The system of claim 12, further comprising the one or more processors to:
generate, by the scoring engine, a return list comprising a subset of the plurality of candidate electronic documents corresponding to one of the plurality of trained sentence vectors having the similarity score above a predetermined threshold; and
provide the return list.

19. The system of claim 12, further comprising the one or more processors to calculate, by the vector generator, a common sentence vector by averaging each of the plurality of trained sentence vectors.

20. The system of claim 12, wherein the plurality of candidate electronic documents comprise web pages, text files, log files, forum questions, or forum answers.

\* \* \* \* \*